United States Patent [19]

Cohen

[11] 4,239,829

[45] Dec. 16, 1980

[54] ADHESIVE BONDING OF HOOK AND LOOP TYPE FABRIC SURFACES

[76] Inventor: Howard S. Cohen, 2001 Lincoln St., Berkeley, Calif. 94709

[21] Appl. No.: 118,456

[22] Filed: Feb. 4, 1980

[51] Int. Cl.³ .......................... B32B 3/06; B32B 7/10; B32B 31/12
[52] U.S. Cl. ............................... 428/86; 24/DIG. 11; 156/91; 156/310; 156/330; 428/100; 428/414
[58] Field of Search .......... 24/73 PF, 201 R, 265 EF, 24/DIG. 11; 156/91, 310, 330; 428/86, 96, 100, 414

[56] References Cited

U.S. PATENT DOCUMENTS

| | | | |
|---|---|---|---|
| 2,650,185 | 8/1953 | Larson et al. | 156/310 |
| 3,323,959 | 6/1967 | Kreckl | 156/310 X |
| 3,461,513 | 8/1969 | Girard et al. | 428/100 X |
| 3,653,098 | 4/1972 | Lagarde et al. | 24/114.5 |
| 3,708,382 | 1/1973 | Erb | 428/100 X |
| 3,773,580 | 11/1973 | Provost | 156/310 X |
| 3,900,360 | 8/1975 | Leatherman | 156/272 |
| 4,064,297 | 12/1977 | Power et al. | 428/86 |

*Primary Examiner*—John T. Goolkasian
*Assistant Examiner*—Robert A. Dawson

[57] ABSTRACT

An adhesive bonding method and apparatus includes a pair of opposed web members having confronting surfaces provided with cooperatively engaging hook and loop portions. The hook portion of one confronting surface is saturated with an epoxy resin or the like, and the loop portion of the other confronting surface is saturated with a catalyst for the resin. The web members are urged together to engage the hook and loop portions and to intermix the catalyst and the resin.

4 Claims, 4 Drawing Figures

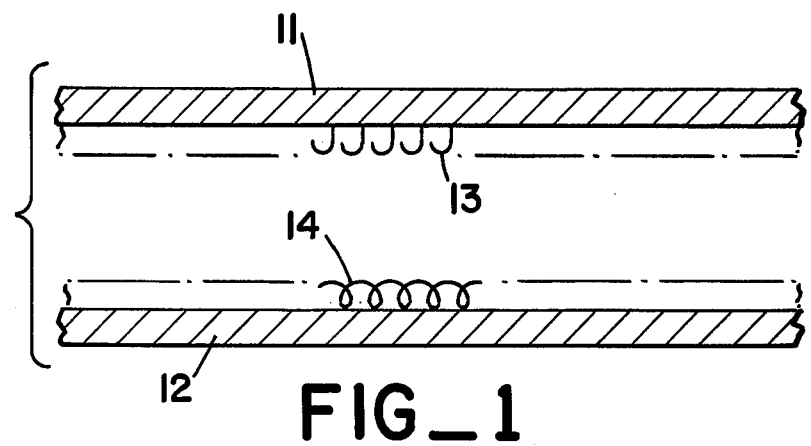
FIG_1
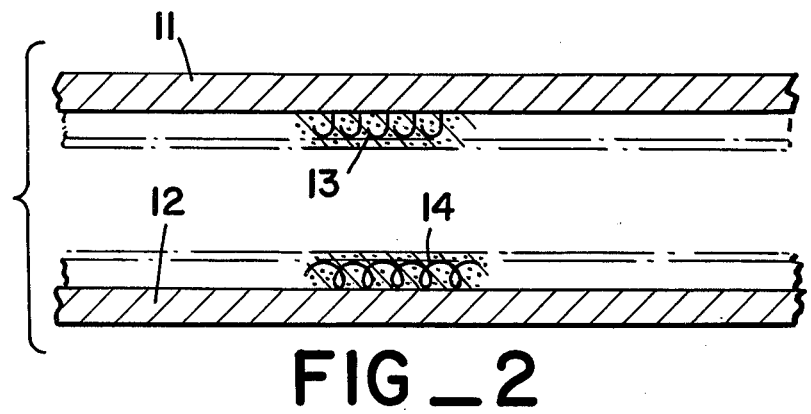
FIG_2
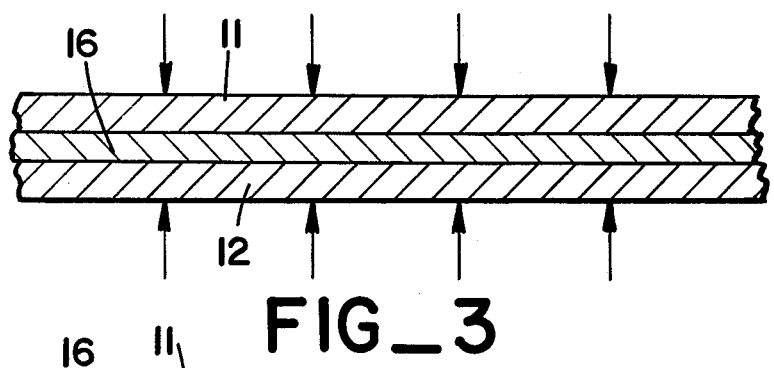
FIG_3
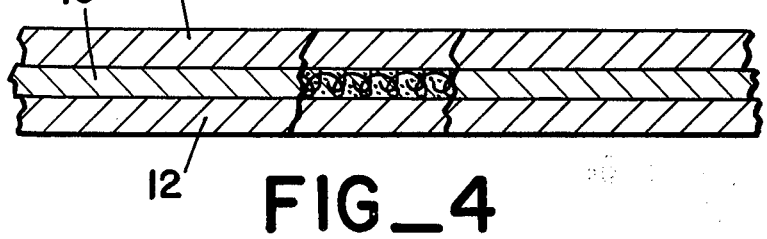
FIG_4

ADHESIVE BONDING OF HOOK AND LOOP TYPE FABRIC SURFACES

BACKGROUND OF THE INVENTION

In recent years epoxy adhesives have gained great acceptance in a wide range of applications. Epoxy adhesives generally comprise a viscous resin compound which is mixed with a catalyst. The catalyst promotes a chemical reaction in the resin compound which causes the resin to harden and to adhere to objects in contact therewith.

One notable drawback to two-part epoxy adhesives is that catalyzed chemical reaction requires a minimum time to proceed to completion; typical minimum time values range from 30 seconds to one hour for various adhesives. During this time the resin exhibits little adhesive action, and the objects to be joined must be maintained engaged by manual force, clamping means, or the like. In those situations in which manual force or clamps are impractical or inconvenient, other adhesives such as contact cement are preferred, due to their virtually instantaneous bonding ability. Contact cement, however, usually does not permit any correction of the relative positions of the objects joined, due to the quick formation of the adhesive bond.

There are, of course, other types of adhesives which also suffer from the same drawback as epoxy compounds; i.e., an inconvenient or intolerable "set up" time.

SUMMARY OF THE PRESENT INVENTION

The present invention generally comprises an adhesive bonding method and apparatus which overcomes the requirement of epoxy adhesives and the like for excessive time to form a bond sufficient to join two objects without mechanical aid. That is, the present invention makes possible the joining of two objects by epoxy adhesives and the like without resorting to clamping devices, manual force, and the like to maintain engagement of the objects during the "set up" time of the adhesive.

The invention provides a pair of web members, each having on one end surface thereof hook fabric or loop fabric, respectively, which is adapted for mutual engagement. One of the fabric portions is saturated with epoxy resin, and the other is coated with epoxy catalyst. Alternatively, the fabric portions may be coated with curable one-part adhesive compound. The web members are brought together to engage the hook and loop fabric portions as well as to mix the resin and the catalyst. The hook and loop engagement maintains the members together while the adhesive cures or hardens. The resulting adhesive bond between the web members is reinforced by the fibers of the hook and loop fabric. The web members may be previously secured to different objects by any means known in the prior art, so that the fabric-reinforced adhesive bond between the web members joins the objects permanently.

A BRIEF DESCRIPTION OF THE DRAWING

FIG. 1 is a symbolic depiction of the opposed web members of the present invention.

FIG. 2 is a schematic depiction of the opposed web members, each coated with an adhesive compound.

FIG. 3 is a schematic depiction of the engagement of the opposed web members.

FIG. 4 is a partially cut-away elevation of the bonded web members.

DESCRIPTION OF THE PREFERRED EMBODIMENT

The present invention is generally characterized as an adhesive bonding method and apparatus which permits the joining of two objects by relatively slow curing adhesives without requiring any external aids to maintain engagement of the objects while the adhesive hardens. As shown in FIG. 1, the invention provides a pair of web members 11 and 12, the web member 11 having on one surface thereof hook fibers 13 extending therefrom. The other web member 12 is provided with loop fibers extending therefrom.

The hook and loop fiber portions 13 and 14 are adapted for mutual releasable engagement, as is known in the prior art, and the web members may comprise hook and loop fabric tape portions of the well-known commercial realization of this type of fastener. It may be appreciated that the web members 11 and 12 each may be secured to different objects, so that the adhesive binding process will join the objects. The web members may be joined to their respective objects by contact adhesive, by embedding the web member in a plastic article during the molding of the article, by rivetting, stapling, or the like.

In the next step of the process, shown in FIG. 2, the hook and loop fabric portions 13 and 14 are coated with adhesive. In one embodiment of the invention, epoxy resin is applied to one of the portions 13 or 14, while epoxy catalyst is applied to the other portion 13 or 14. Alternatively, a relatively slow curing liquid adhesive is applied to one or both of the portions 13 or 14.

With reference to FIG. 3, the web members 11 and 12 are then urged together to bring the hook and loop fabric portions 13 and 14 into impingement. This causes the hooks and loops to engage, as is known in the prior art, joining the web members. At the same time, the intermingling fibers of the hooks and loops facilitate intermixing of the resin and catalyst. In the alternative embodiment the fibers become thoroughly wetted with the liquid adhesive.

In the bonding area 16, the hook and loop fibers maintain engagement while the epoxy resin and catalyst react and harden. However, it may be appreciated that the web members may be separated by moderate force if it is desired to reposition the objects to which the web members are secured. Indeed, separating and re-engaging the hook and loop portions may aid in mixing the resin and catalyst.

After the resin cures or hardens, as depicted in FIG. 4, the web members are laminated together by the epoxy resin in the bonding area 16. The hook and loop fibers which extend into the area 16 reinforce the bond between the web members and act to resist cracking in the bond area, separation of the resin from the web at their interface, or other common bonding failure modes. Likewise, in the alternative embodiment the adhesive bond is augmented in the same way by the engaged fibers.

The objects thus joined are secured permanently, and cannot be parted without extraordinary measures. The bond thus formed is superior in strength and durability, due to the fiber reinforcement of the hardened resin or adhesive. The method and apparatus of the invention obviate the need for clamps and other mechanical aids to maintain impingement of the objects while the resin or adhesive hardens. The invention also permits repositioning or re-alignment of the objects before the adhesive has hardened substantially. Thus the invention is particularly suited to joining permanently objects which are too large and unwieldy to be joined by temporary mechanical means. The invention is also desirable in situations in which there is no clearance or convenient location for the use of mechanical aids during the bonding of two objects.

I claim:

1. A method for permanently bonding two objects, comprising the steps of securing a hook fabric portion to one of said objects, securing a loop fabric portion to the other of said objects, said hook and loop portions being adapted for mutual engagement and retention upon impingement, applying a resin compound to one of said portions, applying a resin catalyst to the other of said portions, bringing said objects together to impinge said hook and loop portions and intermix said resin and catalyst, said hook and loop portions mutually engaging to retain said objects together while said resin and catalyst react, thereafter curing said resin and catalyst to form a hardened, fiber reinforced resin bond between said portions.

2. A method for permanently bonding two objects, comprising the steps of securing a hook fabric portion to one of said objects, securing a pile fabric portion to the other of said objects, said hook and pile portions being adapted for mutual engagement and retention upon impingement, applying an adhesive compound to said hook and pile portions, bringing together said objects to engage said hook and pile portions to retain said objects together, thereafter curing said adhesive to form a fiber reinforced adhesive bond between said portions.

3. A construction for joining permanently two objects, comprising a first member joined to a first object and including a hook fabric portion extending outwardly therefrom, a second member joined to a second object and including a loop fabric portion extending outwardly therefrom, said hook fabric portion engaging said loop fabric portion, and an adhesive compound layer in which said hook and loop fabric portions are embedded, said adhesive compound joining permanently said first and second members.

4. The construction of claim 3, wherein said adhesive compound comprises a cured or catalyzed adhesive resin compound.

* * * * *